United States Patent
Tanaka et al.

(10) Patent No.: US 7,333,182 B2
(45) Date of Patent: Feb. 19, 2008

(54) RANGE FINDER AND METHOD OF REDUCING SIGNAL NOISE THEREFROM

(75) Inventors: Makoto Tanaka, Nagano (JP); Yoshinari Enomoto, Nagano (JP); Takashi Nishibe, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 197 days.

(21) Appl. No.: 11/075,378

(22) Filed: Mar. 8, 2005

(65) Prior Publication Data

US 2005/0206873 A1 Sep. 22, 2005

(30) Foreign Application Priority Data

Mar. 18, 2004 (JP) ............... 2004-078537

(51) Int. Cl.
*G01C 3/08* (2006.01)
(52) U.S. Cl. .................... 356/4.01; 356/3.14
(58) Field of Classification Search ...... 356/4.01–4.07, 356/3.13, 3.14; 382/103–106
See application file for complete search history.

(56) References Cited

U.S. PATENT DOCUMENTS

| | | | | |
|---|---|---|---|---|
| 4,178,098 A | * | 12/1979 | Asano et al. | 356/3.15 |
| 4,251,143 A | * | 2/1981 | Stemme et al. | 396/119 |
| 4,606,630 A | * | 8/1986 | Haruki et al. | 356/3.14 |
| 4,842,411 A | * | 6/1989 | Wood | 356/603 |
| 5,608,664 A | * | 3/1997 | Mori | 708/816 |
| 6,744,982 B2 | * | 6/2004 | Nonaka | 396/121 |
| 2002/0126205 A1 | * | 9/2002 | Saito et al. | 348/139 |
| 2003/0099471 A1 | * | 5/2003 | Nonaka | 396/106 |

FOREIGN PATENT DOCUMENTS

| JP | 2001-350081 A | 12/2001 |
|---|---|---|
| JP | 2003-269954 A | 9/2003 |
| JP | 2004-191739 A | 7/2004 |

OTHER PUBLICATIONS

Izumi Akio et al., "Autofocus Module", Fuji Electric Review, vol. 68, No. 7, pp. 415-420 (1995); English Abstract provided, (cited in Present Application).

* cited by examiner

*Primary Examiner*—Isam Alsomiri
(74) *Attorney, Agent, or Firm*—Rossi, Kimms & McDowell LLP

(57) ABSTRACT

A range finder includes an optical sensor circuit including optical sensors and an integrator circuit disposed for the optical sensors. It further includes selection switches (MOSFETs), which selectively connect optical sensors to the integrator circuit, non-selection switches (MOSFETs), and a biasing voltage circuit or other photoelectron removing device. The non-selection switches (MOSFETS) are switched on to connect the unselected optical sensors to the biasing voltage circuit so that the photoelectron current (photoelectrons) generated in the unselected optical sensors can flow to the biasing voltage circuit but not to the integrator circuit. The range finder can reduce the noises in the unselected optical sensors and measure the object distance accurately.

16 Claims, 14 Drawing Sheets

RANGE FINDER AND METHOD OF REDUCING SIGNAL NOISE THEREFROM

BACKGROUND

FIG. 6 illustrates a measuring system 61 with a diagram describing the triangulation principle for measuring a distance of an object. See for instance Fuji Electric Review, Vol. 68, No. 7, (1995), pp 415-420. Rays from an object 55 are focused on optical sensor arrays 53, 54 through lenses 51, 52 as object images 56, 57. Points G, H are the crossing points of the parallel rays passing the centers C, D of the lenses 51, 52 from an infinite distance, i.e., the optical axes of the lenses 51, 52, and optical sensor arrays 53, 54. The distance between the points G and H is represented by B. The distance between the optical sensor array 53 or 54 and the lens 51 or 52 is represented by fe. The displacements of object images 56 and 57 from optical axes 58 and 59 are represented by X1 and X2, respectively. The sum of X1 and X2 is represented by X. A line 60 extends between points A and E, and extends perpendicular to the line CD.

Since the triangles ACE and CFG are proportional to each other and the triangles AED and DHI are proportional to each other, the distance d of object 55 can be obtained from the following equation (1):

$$d = B \cdot fe/(X1+X2) = B \cdot fe/X \qquad (1),$$

where the sum X is the relative displacement of two object images 56 and 57 from the reference in which the object images 56 and 57 are at the cross points of the optical axes 58, 59 of the lenses 51, 52 and the optical sensor arrays 53, 54. Since the distances B and fe are known constants, the distance d can be obtained by detecting the sum X.

Referring to FIG. 7, which is an exploded perspective view showing the structure of a range finder employing the above-described triangulation principle, the range finder includes an auto-focus IC (hereinafter referred to as an "AFIC") 76, a pair of lenses 71, 72 and a pair of optical sensor arrays 81, 82 and a shield box 73. An IR (infrared ray) cut filter 74 is inserted if necessary. The AFIC 76 and the lenses 71, 72 are fixed to the shield box 73.

FIG. 8(a) is a top plan view of a semiconductor chip sealed in the AFIC. FIG. 8(b) is a top plan view of optical sensor arrays. FIG. 8(c) is a top plan view of an optical sensor. A pair of optical sensor arrays 81, 82, amplifier circuits 83a, 83b, 84a, 84b arranged around optical sensor arrays 81, 82, address circuits 85a, 85b, 86a, 86b, and reference voltage circuits 87a, 87b are integrated into a semiconductor chip 80. In FIG. 8(a), bonding pad arrays 88a and 88b are shown. The amplifier circuits 83a, 83b, 84a, 84b include therein integrator circuit arrays that integrate the currents of the optical sensors. The optical sensor arrays 81 and 82 each include many optical sensors 91a and 91b, respectively. Each optical sensor 91a or 91b includes a light receiving area (light receiving section) 98 and a pickup electrode 92. The light receiving area 98 is formed of a photodiode or a phototransistor. The photodiode or the photo-transistor is formed by implanting ions or by diffusing ions into the surface portion of a semiconductor substrate.

JP PA 2002-077670 discloses a method for correcting the deviation in the positioning of lenses 71, 72 and the optical sensor arrays 81, 82 by widening the regions of optical sensors 91a, 91b in the direction that is perpendicular to the direction in which a pair of the optical sensor arrays 81, 82 are disposed, namely spaced side by side or longitudinally aligned.

Now the main circuit and the structure of a conventional range finder and a camera that mounts the conventional range finder thereon follows. FIG. 9 is a block circuit diagram of an optical sensor circuit that constitutes the conventional range finder. The optical sensor circuit 100 includes an optical sensor 101 and an integrator circuit 102 that integrates the photocurrent flowing through optical sensor 101 to convert the photocurrent to a voltage. The optical sensor 101 is a photoelectric converting device such as a photodiode and a phototransistor. The integrator circuit 102 is a circuit that includes an operational amplifier 103 and a capacitor 104 connected parallel to each other. A positive voltage is applied to the cathode of a photodiode, which forms the optical sensor 101 and a negative voltage to the anode of the photodiode. When light impinges onto the photodiode, photocurrent flows. The integrator circuit 102 integrates the photocurrent and outputs the voltage corresponding to the integrated photocurrent as a sensor output 105.

Referring to FIG. 10, which is a block diagram showing a conventional optical sensor array, an optical sensor circuit array 130 is formed by aligning the optical sensor circuits 100, each formed of the optical sensor 101 and the integrator circuit 102, into a line. In other words, the optical sensor circuit array 130 is formed by aligning the optical sensors 101a, 101b, 101c, etc., into an optical sensor array 110, by aligning the integrator circuits 102a, 102b, 102c, etc., into an integrator circuit array 120, and by arranging the optical sensor arrays 110 and the integrator circuit arrays 120 parallel to each other.

FIG. 11 is a diagram showing the main portion of the conventional range finder. The conventional range finder includes a pair (110a and 110b) of optical sensor arrays 110 shown in FIG. 10 and arranged on the right and left hand sides in FIG. 11, a pair (120a and 120b) of the integrator circuit arrays 120 shown in FIG. 10 and arranged on the right and left hand sides in FIG. 11, an output circuit 132, into which the sensor output signals from the integrator circuit arrays 120a and 120b are input, and a control circuit 131. A pair of optical sensor circuit arrays 130a,130b, formed of a pair of optical sensor arrays 110a, 110b, and a pair of integrator circuit arrays 120a, 120b are integrated in a semiconductor chip (AFIC). A pair of range finding lenses (lenses 71 and 72) are arranged right above the pair of optical sensor arrays 110a and 110b.

FIG. 12 is a diagram showing a conventional camera mounting thereon the range finder shown in FIG. 11. The conventional camera 140 mounts thereon a range finder 142 that is used as an automatic focusing device. Since it is usually difficult to mount the range finder 142 on one side of an image pickup lens 141 due to the limitations caused by the layouts of the constituent elements of the camera 140, the range finder 142 is mounted right above the image pickup lens 141 or diagonally above the image pickup lens 141. The object image is focused on a photosensitive plane by measuring the distance of the object with the range finder 142 and by moving the image pickup lens 141 on the camera 140 based on the measured data. When a range finder is formed in combination with an optical system for focusing the object image on optical sensors aligned into a line, the vertical field of view is limited to one direction and a certain angle of visibility determined by the optical system.

Since parallax forms between the vertical field of view E on the pair of optical sensor arrays 110a, 110b through a range finding lens 143 and the vertical field of view F on a photosensitive plane 144, such as a film through image pickup lens 141, parallax regions 145 are formed. If the object is in any of the parallax regions 145, it will be impossible for the pair of optical sensor arrays 110a, 110b in the range finder to detect the object and to measure the object distance accurately. Therefore, it will be impossible to focus the object image accurately onto the photosensitive plane 144.

To obviate the problem described above, a multi-line sensor that includes many lines of optical sensors is employed. See for instance JP PA 2001-350081, p. 17 and FIG. 12 thereof. FIG. 14 illustrates a main portion of a range finder employing such a multi-line sensor. The multi-line sensor is formed of multiple pairs of optical sensor circuit arrays 130 shown in FIG. 11 arranged perpendicularly to the direction in which each pair of optical sensor circuit arrays 130 are arranged. In the multi-line sensor, integrator circuit arrays 155a, 155b are arranged between optical sensor arrays 151a, 151b arranged side by side on an upper line, and optical sensor arrays 152a, 152b arranged side by side on a middle line. In the same manner, integrator circuit arrays are arranged between the optical sensor arrays arranged side by side on the middle line and the optical sensor arrays arranged side by side on a lower line.

However, when the multiple sensor arrays are used, the regions occupied by the integrator circuit arrays are not the regions in which any optical sensor is disposed. Therefore, wide spaces are formed between the adjacent pairs of optical sensor arrays 151a, 151b and 152a, 152b, and between the adjacent pairs of optical sensor arrays 152a, 152b and 153a, 153b as shown in FIG. 15. A plurality of parallax regions 162 are formed, where the field of view P for the photosensitive plane 161 seen through the image pickup lens 141 and the fields of view L, M, N for the adjacent pairs of optical sensor arrays 151a, 151b; 152a, 152b; and 153a, 153b seen through the range finding lens 143 do not overlap each other. In other words, parallax regions still exist. Due to the parallax regions, it becomes impossible to measure the object distance accurately. Therefore, it becomes impossible to focus the object image on photosensitive plane 161 accurately. Since the integrator circuits are disposed for the respective optical sensors, the number of wiring is also increased. Due to the increasing number of wiring, the area occupied by the wiring and the area occupied by the integrator circuit arrays are widened. Therefore, the chip size is increased.

A range finder having a small chip size and capable of correcting the parallax problem accurately is described, for instance, in JP PA 2002-360788 (unpublished patent application), which published as JP 2004-191739 on 8 Jul. 2004. FIG. 16 is a block circuit diagram of an optical sensor circuit illustrated in that reference. The block circuit diagram described in FIG. 16 corresponds to the optical sensor circuit described in FIG. 9. The optical sensor circuit 210 includes multiple optical sensors (three optical sensors 201, 202, and 203 in the figure) for constituting multiple optical sensor arrays, selection switches (MOSFETs 204, 205, 206) for selecting the optical sensors 201, 202, 203, and an integrator circuit 207 for integrating the current from the optical sensors 201, 202, 203. The optical sensors 201, 202, 203 are, for example, photodiodes. The integrator circuit 207 is, for example, a circuit in which an operational amplifier 208 and a capacitor 209 are connected parallel to each other. When light impinges onto the photodiode, photocurrent flows. The integrator circuit 207 integrates the photocurrent and outputs the voltage corresponding to the integral photocurrent as a sensor output.

FIG. 17 is a diagram showing the layout of the optical sensor circuit arrays constituting the range finder shown in FIG. 16. FIG. 17 corresponds to FIG. 10 showing the layout of a conventional optical sensor array. The optical sensor circuits 210 shown in FIG. 16 are aligned to form an optical sensor circuit array 220. The optical sensor circuit array 220 includes three optical sensor arrays 221, 222, 223 and an integrator circuit array 224 arranged such that a multi-line sensor has a very narrow spacing between the lines (sensor arrays). The number of the optical sensor arrays (lines) is not limited to 3.

Since only the selection switches, which are MOSFETs 204a, 204b, 204c, etc., MOSFETs 205a, 205b, 205c, etc., and MOSFETs 206a, 206b, 206c, etc., are disposed in the spaces between the lines, it is possible to narrow the line spacing. The upper optical sensor array 221 is formed of optical sensors 201a, 201b, 201c, etc., the middle optical sensor array 222 is formed of optical sensors 202a, 202b, 202c, etc., and the lower optical sensor array 223 is formed of optical sensors 203a, 203b, 203c, etc. When the MOSFETs 204a, 204b, 204c, etc. are switched on, the photocurrents from optical sensors 201a, 201b, 201c, etc., flow to the integrator circuits 207a, 207b, 207c, etc. constituting the integrator circuit array 224. The integrator circuits 207a, 207b, 207c, etc. integrate the respective photocurrents and output the voltages corresponding to the respective integral photocurrents as sensor output signals.

FIG. 18 is a block diagram schematically showing the main portion of the range finder using the optical sensors shown in FIG. 16. The range finding lenses and such constituent elements are not illustrated in FIG. 18. The range finder in FIG. 18 includes 3 lines of sensor arrays: an upper pair of optical sensor arrays 221a, 221b, a middle pair of optical sensor arrays 222a, 222b, and a lower pair of optical sensor arrays 223a, 223b. A pair of integrator circuit arrays 224a, 224b is disposed for the 3 lines of sensor arrays. As described above, the optical sensors in the optical sensor arrays are connected via the respective small selection switches, i.e., MOSFETs, (not shown) to the respective integrator circuits constituting the integrator circuit arrays. The integrator circuits integrate the photocurrents from the optical sensors in the selected optical sensor arrays, convert the integral photocurrents to voltages, and output the respective converted voltages as sensor output signals. The signals for switching on and off the MOSFETs are transmitted from a control circuit 225 arranged in the central part of the range finder. The sensor output signals from integrator circuits 224 are input to an output circuit 226. The output signal corresponding to the sensor output signals from the integrator circuits 224 is transmitted from the output circuit 226 to the image pickup optical system including the image pickup lenses. In FIG. 18, the wiring among the sensors, the integrator circuits, the control circuit, and the output circuit have been omitted.

FIG. 19 is a diagram describing the relations between the object distances measured by the range finder shown in FIG. 18 and the fields of view. Now explanations will be made on measuring the distances of objects 229 on a measuring axis 228 spaced apart for a predetermined distance from and extending parallel to an optical axis 227 connecting the center of a range finding lens 230 and the center of the lower pair of optical sensor arrays 223a, 223b, fixed such that optical sensor arrays 223a, 223b are in a light receiving area receiving the light from an infinite point.

The distance of an object 229a in a far range is measurable, since the object 229a is in the field of view A of the lower pair of optical sensor arrays 223a, 223b. The distance of an object 229b in a middle range is measurable, since object 229b is in the field of view B of the middle pair of optical sensor arrays 222a, 222b. The distance of an object 229c in a close range is measurable, since object 229c is in the field of view C of the upper pair of optical sensor arrays 221a, 221b. By selecting the optical sensor array pair suitable for light receiving depending on the range, in which the object is located in the field of view of the optical sensor arrays independently of the object distance and, therefore, accurate distance measurement can be facilitated.

The above-identified reference, JP PA 2002-360788, describes 3 lines of sensor array group exhibiting a parallax correction function. This configuration is useful for increasing the number of lines to 13 as shown in FIG. 20 to widen the field of view vertically as shown in FIG. 21 so that a multi-point range finder can be obtained. The range finder as shown in FIG. 20 facilitates two-dimensional image recognition.

FIG. 22 is a cross sectional view of the main portion of the range finder shown in FIG. 20. In FIG. 22, the optical sensors constituting two lines in the B section surrounded by the dotted lines in FIG. 20 are shown. The B section corresponds to the C section surrounded by the dotted lines in FIG. 16. The reference numeral 251 designates one optical sensor in a line 1, which is a first optical sensor. The reference numeral 252 designates one optical sensor in a line 2, which is a second optical sensor. A p-type well region 322 is formed in the surface portion of an n-type substrate 321. A first n-type region 323 and a second n-type region 324 are formed in the surface portion of the p-type well region 322 such that the first and second n-type regions 323 and 324 are spaced apart from each other. A third n-type region 325 is formed adjacent to the first n-type region 323 and a fourth n-type region 326 is formed adjacent to the second n-type region 324. A first gate electrode 330 is formed above a portion of the p-type well region 322 extending between the first and third n-type regions 323 and 325 with a gate insulator film 329 interposed between the first gate electrode 330 and the extending portion. A second gate electrode 332 is formed above the other extending portion of the p-type well region 322 extending between the second and fourth n-type regions 324 and 326 with gate insulator film 329 interposed between the second gate electrode 332 and the other extended portion. The first n-type region 323 and p-type well region 322 constitute a first optical sensor 251. The second n-type region 324 and p-type well region 322 constitute a second optical sensor 252. A first MOSFET 253 is formed of the first n-type region 323, the third n-type region 325, and the first gate electrode 330. A second MOSFET 254 is formed of the second n-type region 324, the fourth n-type region 325, and the second gate electrode 332.

The MOSFETs 253 and 254 are selection switches for connecting the optical sensors 251 and 252 to an integrator circuit 255. By switching on the MOSFETs 253 and 254, that is, by switching on the selection switches, the optical sensors 251, 252 are connected to an integrator circuit 255. The optical sensors in this state are referred to as the "selected optical sensors." On the other hand, by switching off the MOSFETs 253 and 254, the optical sensors 251 and 252 are disconnected from the integrator circuit 255. The optical sensors in this state are referred to as the "unselected optical sensors."

Many first optical sensors are aligned to form a first optical sensor array. A first optical sensor line (line 1) is formed of a pair of first optical sensor arrays. Many second optical sensors are aligned to form a second optical sensor array. A second optical sensor line (line 2) is formed of a pair of second optical sensor arrays. Both the third and fourth n-type regions 325 and 326 are connected to the input of the integrator circuit 255. In this manner, the range finder as shown in FIG. 20, having 13 optical sensor lines and capable of finding the ranges of multiple points, is formed. The range finder includes as many integrator circuits as there are the optical sensors (448 in FIG. 21) included in a pair of optical sensor arrays (one optical sensor line).

A positive voltage, e.g., around 1.6 V, is applied from the input side of integrator circuit 255 to the third and fourth n-type regions 325 and 326. The p-type well region 322 is grounded. A positive supply voltage, e.g., around 3.3 V, is applied to the n-type substrate 321. An ON-signal is fed to the first gate electrode 330, to which the selection signal 1 is to be supplied, to form a channel 335 in the first MOSFET 253. Pairs of an electron 338 and a hole 339 are generated by the light that has impinged onto the first optical sensor 251 (the selected optical sensor) in the pair of first optical sensor arrays in the first optical sensor line (line 1). Photoelectron current 340 flows from the first n-type region 323 to the integrator circuit 255 via the channel 335 and the third n-type region 325, raising the sensor output voltage. The photo-hole current 341 flows to the ground.

When an ON-signal is fed to the first gate electrode 330, to which the selection signal 1 is to be supplied, an OFF-signal is fed to second gate electrode 332, to which the selection signal 2 is to be supplied. Since the second MOSFET 254 is OFF, no channel is formed in the second MOSFET 254. Since no channel is formed, the second n-type region 324, which is the second optical sensor 252 (the unselected optical sensor), is in the floating state. In other words, the potential of the second n-type region 324 is floating. If pairs of electron 338 and hole 339 are caused by the light that has impinged onto the second optical sensor 252 in the floating state, photo-hole current 341 will flow to the ground. However, the photoelectron current 340 will flow into the fourth n-type region 326 biased at a positive potential and further to the integrator circuit 255, causing noises. In short, the noises are formed by the electrons generated by the light that has impinged onto the unselected optical sensor.

The noises are high especially in the multi-point range finder that includes many optical sensor lines, since many optical sensors are left unselected. When the range finder includes 13 optical sensor lines, one of the optical sensor lines is selected and the rest of the optical sensor lines (12 lines) are unselected. Due to many unselected optical sensor lines, the ratio of the noise photoelectron currents from the unselected optical sensors in the 12 optical sensor lines to the normal photoelectron currents flowing to the integrator circuits is as high as 40%, making it hard to conduct accurate range finding.

In view of the foregoing, there still remains a need for a range finder that reduces the noises caused by the unselected optical sensors and measuring the object distance accurately. The present invention addresses this need.

SUMMARY OF THE INVENTION

One aspect of the present invention is a range finder, which can be used, for example, in the automatic focusing mechanisms for cameras. Specifically, the present range finder can correct the parallax between the image pickup optical system, which picks up the image of an object through image pickup lenses, and the range finding optical system, which measures the distance of the object through range finding lenses. Another aspect is a method of reducing signal noise in the range finder.

The range finder can include multiple pairs of optical sensor arrays, a pair of range finding lenses, integrator circuits, a biasing circuit or means for removing photocharges from the pairs of optical sensor arrays to prevent currents from the optical sensors from flowing to the integrator circuits, and a control means. Each array has multiple optical sensors arranged side by side, and the multiple pairs of optical sensor arrays are arranged parallel to each other. The range finding lenses are for focusing images of an object onto at least one of the pairs of optical sensor arrays to measure the distance of the object based on image output signals indicating the light intensities received by the optical sensors of the at least one pair of optical sensor arrays. The control means is for connecting the at least one pair of optical sensor arrays to the integrator circuits and for connecting all other pairs of optical sensor arrays other than the at least one pair of optical sensor arrays to the biasing circuit or the removing means.

The biasing circuit can apply a bias voltage to the all other pairs of optical sensor arrays other than the at least one pair of optical sensor arrays. The bias voltage can be set to be equal to an input terminal voltage of the integrator circuits. The biasing circuit thus removes photo-charges from the pairs of optical sensor arrays not connected to the integrator circuits.

The control means can include first selecting means for selecting the at least one of the pairs of optical sensor arrays to set an effective light receiving area, and second selecting means for selecting the other of the pairs of the optical sensor arrays other than the at least one of the pairs of optical sensor arrays selected by the first selecting means. The control means also can be selecting means for selecting the at least one of the pairs of optical sensor arrays to set an effective light receiving area.

The integrator circuits, which can be in a form of a pair of integrator circuit arrays, integrate the output currents from the optical sensors of the at least one of the pairs of optical sensor arrays selected by the first selecting means or the selecting means, and the biasing circuit can apply the bias voltage to the optical sensors of the pairs of optical sensor arrays selected by the second selecting means or not selected by the selecting means.

The selection of the at least one of the pairs of optical sensor arrays selected by the selecting means can be controlled depending on the measuring range of the object to set the effective light receiving area.

The range finder can further include a semiconductor substrate of a first conductivity type, a semiconductor region of a second conductivity type on the semiconductor substrate, first regions of the first conductivity type in the surface portion of the semiconductor region, a second region of the first conductivity type formed on one side of each of the first regions and spaced apart from the first regions, a third region of the first conductivity type formed on the other side of each of the first regions and spaced apart from the first regions, a first gate electrode above a portion of the semiconductor region extending between each of the first regions and the respective second region with a gate insulator film interposed therebetween, a second gate electrode above a portion of the semiconductor region extending between each of the first regions and the respective third region with a gate insulator film interposed therebetween.

The optical sensor arrays can comprise the semiconductor region and the first regions, the first selecting means can comprise the first MOSFETS, each comprising one of the first regions, the respective second region, and the respective first gate electrode, the second selecting means can comprise the second MOSFETS, each comprising one of the first regions, the respective third region, and the respective second gate electrode. The second region can be connected to one of the integrator circuits, the third region can be connected to the biasing circuit, the semiconductor region can be grounded, and ON-OFF signals input to the first gate electrode and the respective second gate electrode are always opposite to each other.

Both end portions of the first regions can be diffused deeply. The semiconductor region can be grounded, and the pn-junction between the semiconductor substrate and the semiconductor region can be biased in reverse.

The range finder can include a first guard ring region of the first conductivity type formed on one side of each of the first regions and spaced apart from the first regions, a second guard ring region of the first conductivity type formed on the other side of each of the first regions and spaced apart from the first regions, an optical sensor connecting region of the first conductivity type spaced apart from the respective first guard ring region and connected electrically to each of the first regions, and an integrator circuit input region of the first conductivity type spaced apart from the respective optical sensor connecting region. The gate electrode can be formed above a portion of the semiconductor region extending between the respective optical sensor connecting region and the respective integrator circuit input region with a gate insulator film interposed therebetween. The selecting means can comprise MOSFETS, each comprising the optical sensor connecting region, the respective integrator circuit input region, and the respective gate electrode. The integrator circuit input region can be connected to one of the integrator circuits, the first and second guard ring regions can be connected to the biasing circuit.

The range finder can include trenches in the semiconductor region, one of the trenches being in contact with each of the first regions and the respective second region, and the gate electrodes can be formed in the trenches.

The method of reducing signal noise in the above-described range finder can include the steps of providing a biasing circuit for applying a bias voltage or for removing photocharges from the optical sensors, and connecting all pairs of optical sensor arrays other than the at least one pair of optical sensor arrays to the bias circuit to allow the photocharges therefrom to flow to the biasing circuit, thereby preventing the photocharges therefrom from flowing into the integrator circuits.

DETAILED DESCRIPTION

The present invention can be employed to prevent the photo-charges (photoelectrons) from the unselected optical sensors from flowing into the integrator circuits. This can be achieved by disposing a biasing voltage circuit to force the photo-charges generated from the unselected optical sensors to flow into the biasing voltage circuit. Alternatively, the a trench gate structure for the selection switches can be employed or by deepening the pn-junctions in both end portions of the optical sensors to make the photo-charges generated from the unselected optical sensors to flow into the substrate.

Figure 1:
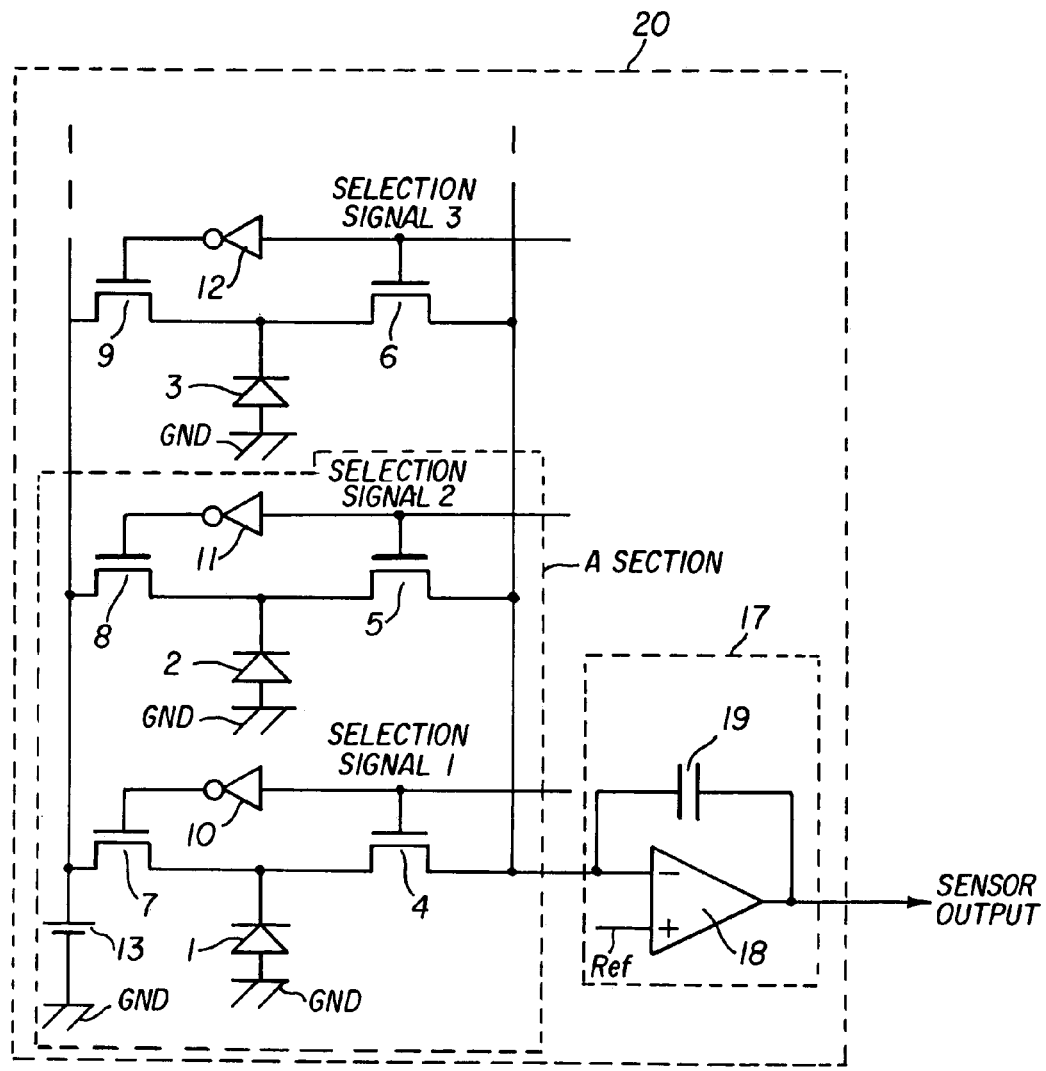
FIG. 1 is a block circuit diagram showing the main portion of a range finder according to a first embodiment of the invention.
Figure 17:
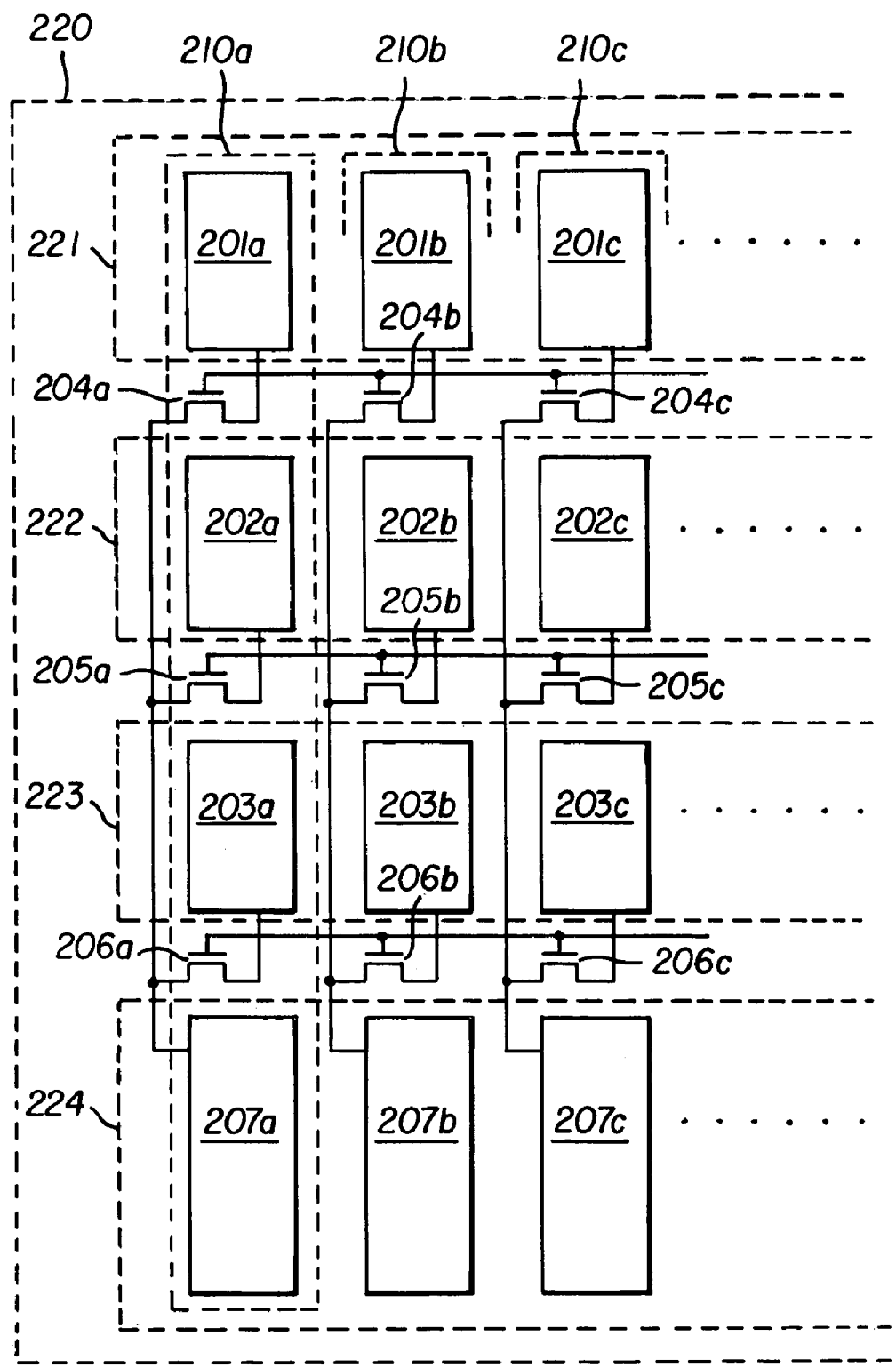
FIG. 17 is a diagram showing the layouts of the optical sensor circuit arrays constituting the range finder shown in FIG. 16.
Figure 18:
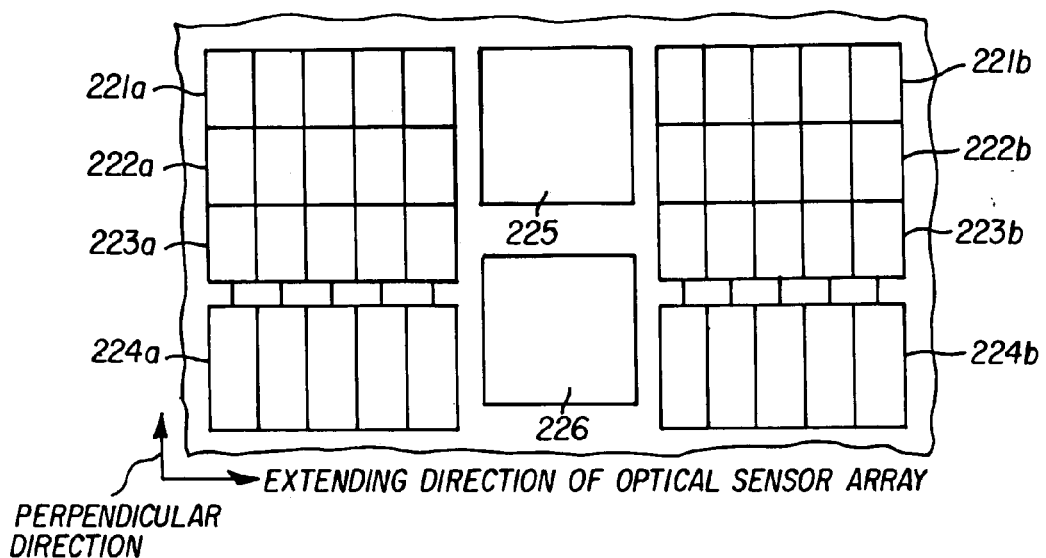
FIG. 18 is a block diagram schematically showing the main portion of the range finder shown in FIG. 16.
Figure 19:
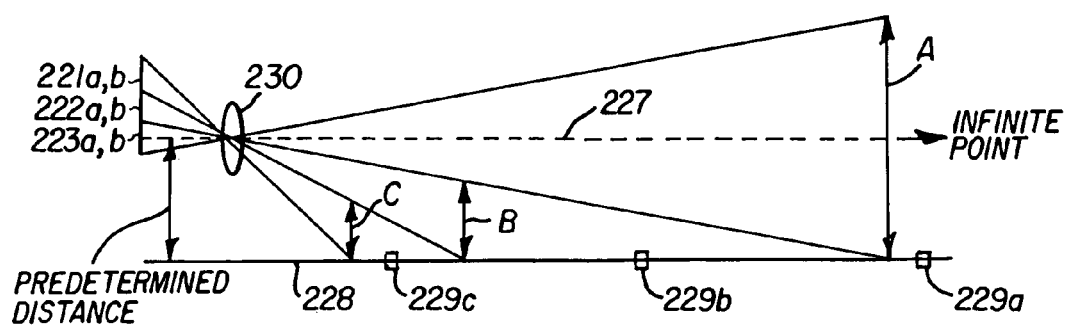
FIG. 19 is a diagram describing the relations between the object distances measured by the range finder shown in FIG. 18 and the fields of view.
Figure 20:
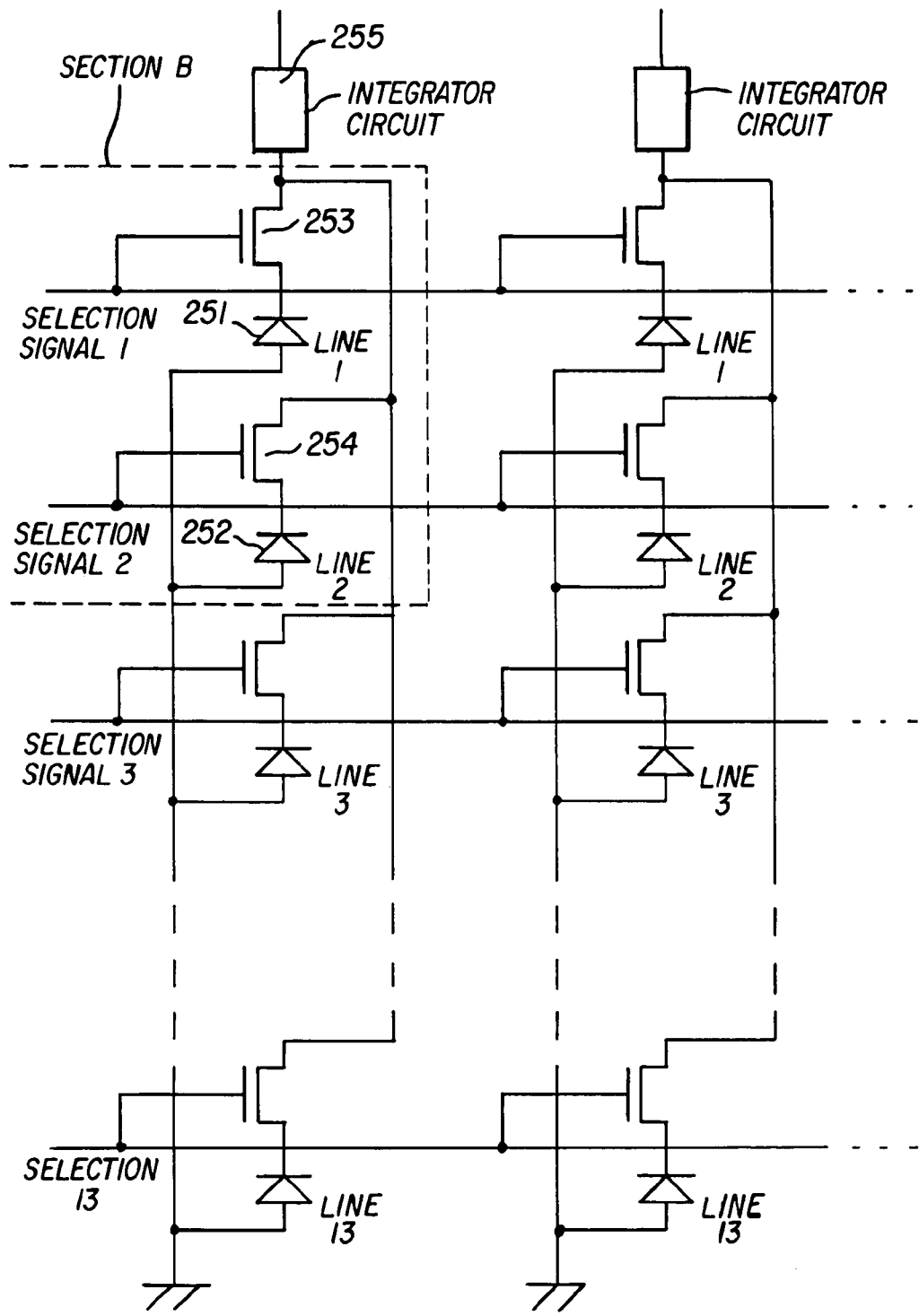
FIG. 20 is a block circuit diagram of a conventional multi-line sensor.
Figure 21:
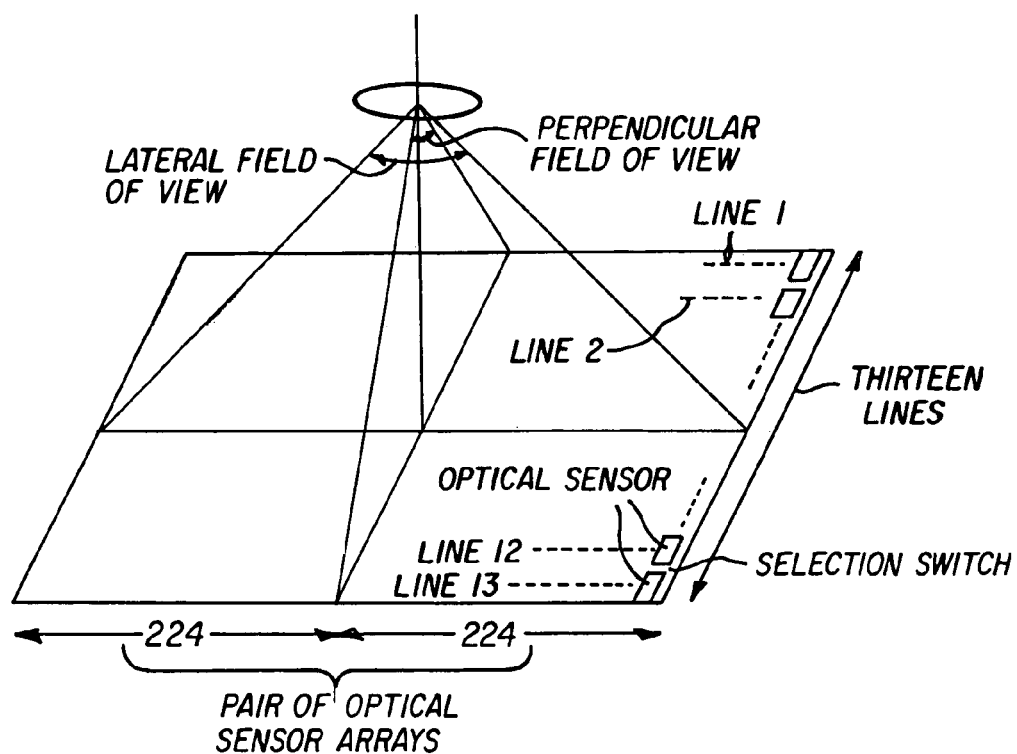
FIG. 21 is a perspective view explaining the vertical field of view obtained by increasing the lines of optical sensor array pairs.
Figure 22:
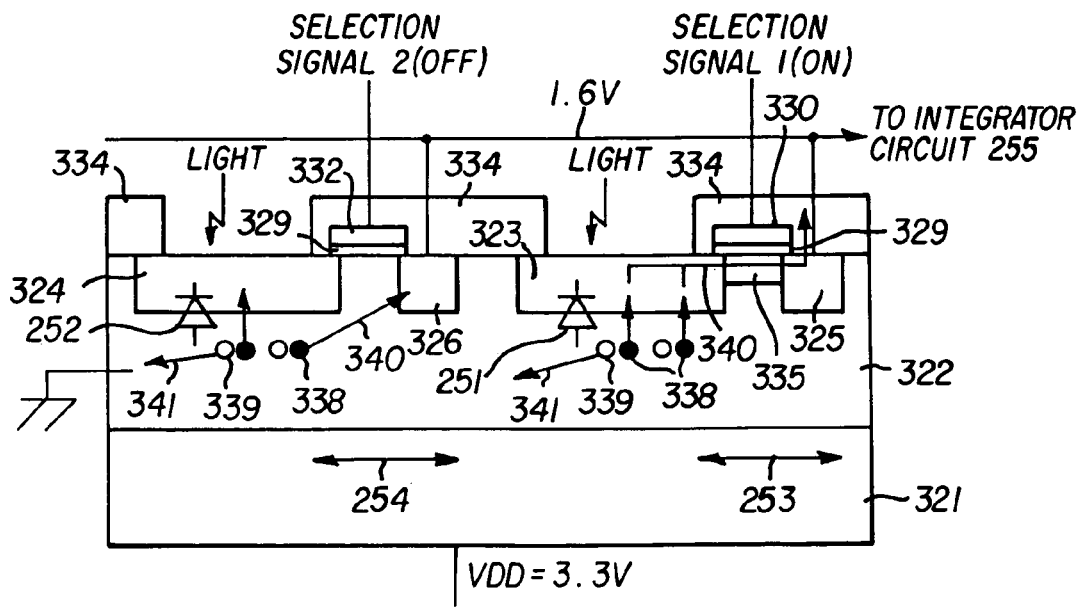
FIG. 22 is a cross sectional view of the main portion of the range finder shown in FIG. 20.

Referring to FIG. 1, which is a block circuit diagram showing the main portion of a range finder according to a first embodiment of the invention, the range finder includes an optical sensor circuit 20 including multiple pairs of optical sensor arrays (multiple optical sensor lines) to form an array of optical sensor circuits 20. Each optical sensor array includes multiple optical sensors, such as illustrated in FIGS. 17 and 18. In FIG. 1, only three optical sensor lines of each of the pairs of optical sensor arrays are shown for illustration purposes. The remaining sensor lines are represented by the bold phantom lines extending vertically, and only one of the optical sensors constituting a sensor line is shown. Therefore, optical sensors 1, 2, 3, etc., are in the respective (three) sensor lines in each of the pair.

Each optical sensor circuit 20 includes an integrator circuit 17 for the optical sensors 1, 2, 3, etc., selection switches (MOSFETs) 4, 5, 6, etc., associated with each of the optical sensors 1, 2, 3, etc., for selecting and connecting the optical sensors 1, 2, 3, etc., to the respective integrator circuit 17, non selection switches (MOSFETs) 7, 8, 9, etc., and NOT circuits 10, 11, 12, etc., associated with each of the optical sensors 1, 2, 3, etc. The circuit also includes a biasing voltage circuit 13 for biasing any of unselected optical sensors to the ground. The optical sensors 1, 2, 3, etc., can be photodiodes, for example. Each integrator circuit 17 includes, for example, an operational amplifier 18 and a capacitor 19 connected parallel to each other. When light impinges onto the photodiodes, photocurrents flow. The integrator circuit 17 integrates the photocurrents and outputs the voltage corresponding from the optical sensor circuit 20 as a sensor output.

It should be noted that the range finder includes an array of the optical sensor circuits 20, which includes a pair of integrator circuit arrays (one array for the right side and the other array for the left side) each having the same number of integrator circuits 17 as there are the optical sensors 1, 2, 3, etc., of each of the optical sensor arrays, similarly as shown in FIGS. 17 and 18.

Still referring to FIG. 1, the gates of the respective selection switches 4, 5, 6, etc., are connected to the inputs of the NOT circuits 10, 11, 12, etc. The outputs of the respective NOT circuits 10, 11, 12, etc., are connected to the gates of the non-selection switches (MOSFETs) 7, 8, 9, etc., respectively. The optical sensors 1, 2, 3, etc., are connected to the biasing voltage circuit 13 for biasing via the non-selection switches (MOSFETs) 7, 8, 9, etc., respectively. The selection switches and the non-selection switches are switched on and off always opposite to each other by the NOT circuits 10, 11, 12, etc.

Now the operations of the optical sensor circuit 20 will follow. When the MOSFET 4, which is a selection switch, is switched on by inputting an ON-signal as a selection signal 1, the photoelectrons generated in the selected optical sensor 1 flow into the integrator circuit 17 via the MOSFET 4, raising the sensor output voltage. As the photoelectron current becomes higher, the voltage rise becomes higher. The photo-holes generated in the selected optical sensor 1 flow to the ground. Since the non-selection switches 8 and 9 are ON, however, the photoelectrons generated in the unselected optical sensors 2 and 3 flow to the biasing voltage circuit 13. Since the photoelectrons generated in the unselected optical sensors 2 and 3 do not flow into integrator circuit 17, the photoelectrons generated in the unselected optical sensors 2 and 3 do not cause noises, and therefore, accurate range finding becomes possible. As a result, very accurate parallax correction and very accurate multi-point range finding become possible. The configuration that employs selection and non selection switches according to the first embodiment is effective for multi-point range finding, in which many optical sensor lines are involved.

When a range finder including many optical sensor lines according to the first embodiment is used, the distance of an object is measured accurately by image recognition of the object location with multiple sensor lines in advance and by selecting a point desirable to measure in the object location, the image of which has been recognized, based on an algorithm prepared for the specific purpose.

When the object distance is known in advance, the range finder according to the first embodiment can be used for recognizing the object image without making the range finding function work. Although the object image may not be as sharp or clear in this case, the range finder according to the first embodiment still can be used for recognizing what the object is (whether the object is a human being or an object). When the object is moving, the moving direction of the object (whether the object is moving forward, backward, leftward or rightward) can be estimated accurately by the range finder according to the first embodiment.

Figure 2:
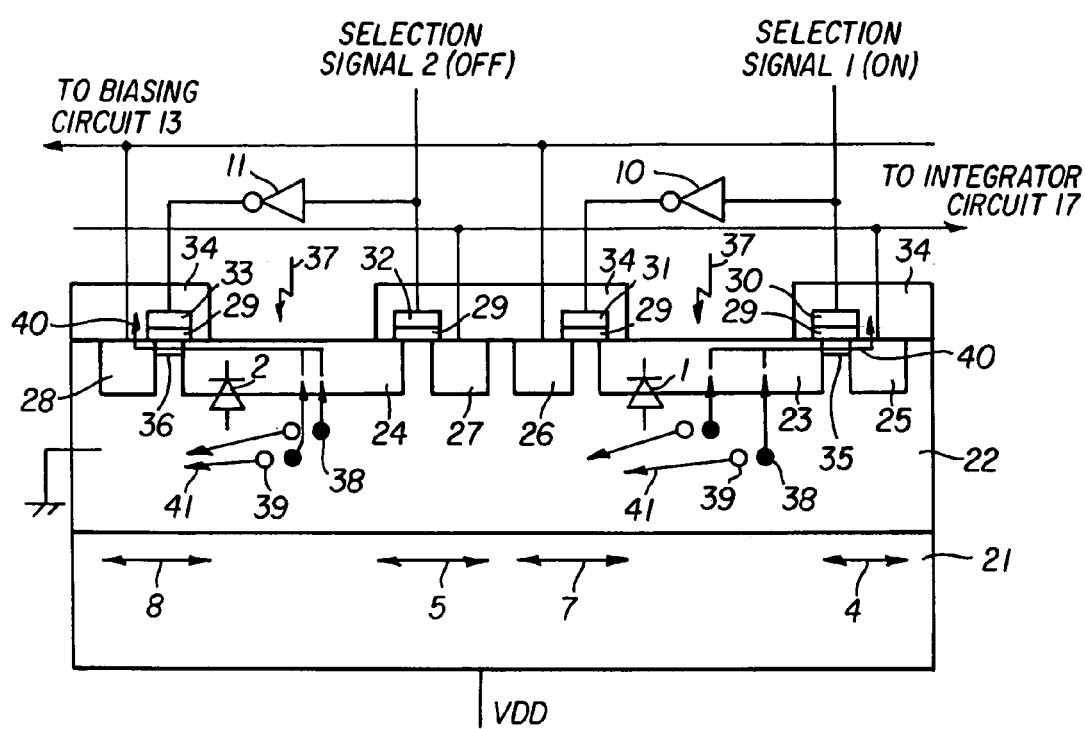
FIG. 2 is a cross sectional view showing the main portion of a range finder according to a second embodiment of the invention.

FIG. 2 is a cross sectional view showing the main portion of a range finder according to a second embodiment of the invention. In FIG. 2, the range finder structure as shown in FIG. 1, namely section A surrounded by the dotted lines in FIG. 1, is formed in a semiconductor substrate. Although the circuits disposed outside the dotted lines such as the integrator circuits, the biasing voltage circuit, the NOT circuits and the other circuits not shown, such as a control circuit and an output circuit, are also formed in the same semiconductor substrate, these circuits have not been illustrated in detail.

Still referring to FIG. 2, a p-type well region 22 is formed in the surface portion of an n-type substrate 21. A first n-type region 23 and a second n-type region 24 are formed in the surface portion of the p-type well region 22 such that the first n-type region 23 and the second n-type region 24 are spaced apart from each other. A third n-type region 25 is formed on one side of the first n-type region 23 and a fifth n-type region 26 on the other side of the first n-type region 23. A fourth n-type region 27 is formed on one side of the second n-type region 24 and a sixth n-type region 28 on the other side of the second n-type region 24. A first gate electrode 30 is formed above the portion of the p-type well region 22 extending between the first n-type region 23 and the third n-type region 25 with a gate insulator film 29 interposed between the extending portion and the first gate electrode 30. A second gate electrode 32 is formed above the portion of the p-type well region 22 extending between the second n-type region 24 and the fourth n-type region 27 with the gate insulator film 29 interposed between the extended portion and the second gate electrode 32. A third gate electrode 31 is formed above the portion of the p-type well region 22 extending between the first n-type region 23 and the fifth n-type region 26 with the gate insulator film 29 interposed between the extended portion and the third gate electrode 31. A fourth gate electrode 33 is formed above the portion of the p-type well region 22 extending between the second n-type region 24 and the sixth n-type region 28 with the gate insulator film 29 interposed between the extending portion and the fourth gate electrode 33. A first optical sensor 1 is formed of the first n-type region 23 and the p-type well region 22. A second optical sensor 2 is formed of the second n-type region 24 and the p-type well region 22. A first MOSFET (first selection switch) 4 is formed of the first n-type region 23, the third n-type region 25, and the first gate electrode 30. A second MOSFET (second selection switch) 5 is formed of the second n-type region 24, the fourth n-type region 27, and the second gate electrode 32. A third MOSFET (first non-selection switch) 7 is formed of the first n-type region 23, the fifth n-type region 26, and the third gate electrode 31. A fourth MOSFET (second non-selection switch) 8 is formed of the second n-type region 24, the sixth n-type region 28, and the fourth gate electrode 33.

A first optical sensor array is formed by aligning many first optical sensors 1 side by side. A first optical sensor line (line 1) is formed of a pair of the first optical sensor arrays. A second optical sensor array is formed by aligning many second optical sensors 2 side by side. A second optical sensor line (line 2) is formed of a pair of the second optical sensor arrays, and so on. The third n-type region 25 and the fourth n-type region 27 are connected to the input of the integrator circuit 17. The fifth n-type region 26 and the sixth n-type region 28 are connected to the biasing voltage circuit 13 for biasing to the ground. The first gate electrode 30 and the third gate electrode 31 are connected to each other via the NOT circuit 10. The second gate electrode 32 and the fourth gate electrode 33 are connected to each other via the NOT circuit 11. Thus, a range finder including the biasing voltage circuit 13 and multiple (e.g., thirteen) optical sensor lines and capable of measuring the multiple point distances is formed. By increasing the optical sensor lines, the measuring range is widened.

The operations of the range finder according to the second embodiment will be described below with reference to FIG. 2. When the first MOSFET 4, which is the first selection switch, is switched on by feeding an ON-signal as a selection signal 1 to the first gate electrode 30, photoelectron current 40 generated in the first optical sensor 1 flows into the integrator circuit 17 via the first MOSFET 4, raising the sensor output voltage. As the photoelectron current 40 becomes higher, the voltage rise becomes higher. The photohole current 41 generated in the selected optical sensor 1 flows to the ground. At this timing, an OFF-signal is fed to the second gate electrode 32 as a selection signal 2. At the same time, an ON-signal is fed to the fourth gate electrode 33 connected via the NOT circuit 11. Since the fourth MOSFET 8, which is the second non-selection switch, is switched on, a photoelectron current 40 generated in second optical sensor 2 is made to flow to the biasing voltage circuit 13 via the fourth MOSFET 8. Since the photoelectron current 40 generated in the second optical sensor 2 does not flow into the integrator circuit 17, the photoelectron current 40 generated in the second optical sensor 2 does not cause noises. Therefore, very accurate range finding is facilitated. As a result, very accurate parallax correction and very accurate multi-point range finding are facilitated. The configuration according to the second embodiment is very effective for multi-point range finding, in which many optical sensor lines are involved. The photo-hole current 41 generated in the unselected optical sensor 2 flows to the ground in the same manner as the photo-hole current 41 generated in selected optical sensor 1. The photocurrent that flows out from the optical sensor is the sum of the photoelectron current 40 and the photo-hole current 41.

If the flow around of the photo-charges (photoelectrons 38 and photo-holes 39) is considered, the voltage of the biasing voltage circuit 13 (bias voltage) will be most effective when the bias voltage is equal to the power supply voltage (e.g., VDD=3.3 V), at which the depletion layers in the pn-diodes (optical sensors 1 and 2) expand to their maximum when the p-type well region 22 is grounded. The potential difference (e.g., 1.7 V) between the bias voltage (e.g. 3.3 V) and the input terminal voltage of the integrator circuit 17 (imaginarily shorted to and fixed at the reference voltage ref, e.g., 1.6 V) causes leakage current in the MOSFETs working as selection switches. The leakage current is added to the dark current (the current of the optical sensor that is not receiving light) and affects the sensor characteristics in the dark adversely. Therefore, it is desirable in practice for the input terminal voltage of integrator circuit 17 and the voltage of biasing voltage circuit 13 to be equal to each other so as not to cause any leakage current.

The conductivity types of the respective regions can be exchanged with no problem. Since the polarity of the bias voltage is also exchanged, a negative power supply voltage is applied to the p-type substrate corresponding to the n-type substrate 21.

Figure 3:
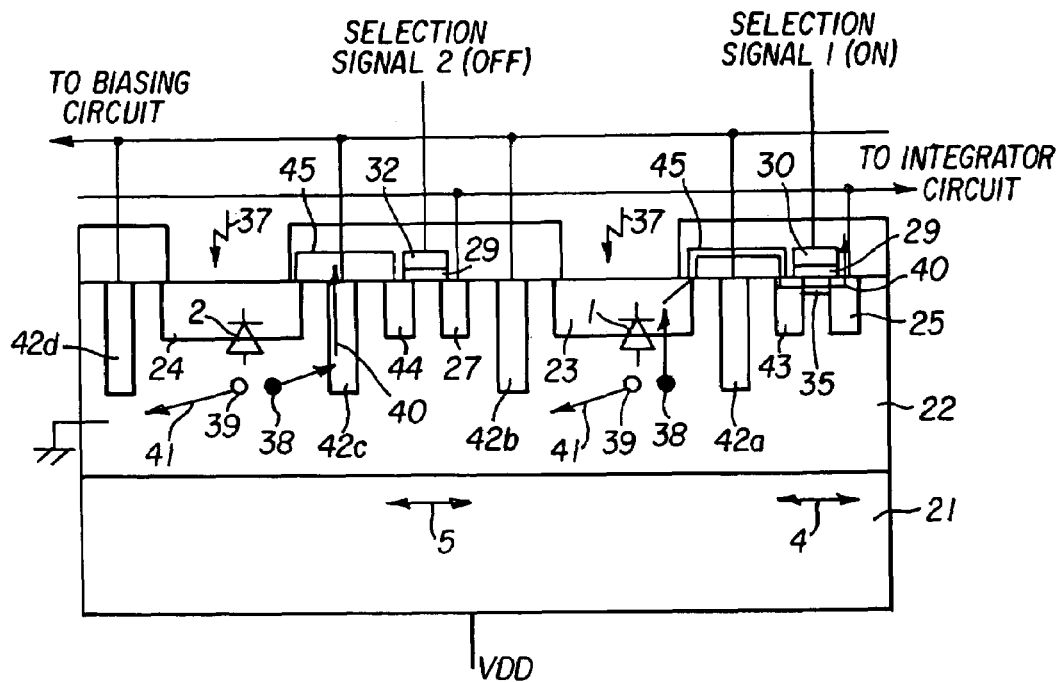
FIG. 3 is a cross sectional view showing the main portion of a range finder according to a third embodiment of the invention.

FIG. 3 is a cross sectional view showing the main portion of a range finder according to a third embodiment of the invention. Referring now to FIG. 3, a first guard ring region 42a is formed on one side of a first n-type region 23 such that the first guard ring region 42a is spaced apart from the first n-type region 23. A second guard ring region 42b is formed on the other side of the first n-type region 23 such that the second guard ring region 42b is spaced apart from the first n-type region 23. A seventh n-type region 43 and a third n-type region 25 are formed such that the seventh n-type region 43 is spaced apart from the first guard ring region 42a and the third n-type region 25. The first n-type region 23 and the seventh n-type region 43 are connected to each other via wiring 45. A first gate electrode 30 is formed above the portion of the p-type well region 22 extending between the third n-type region 25 and the seventh n-type region 43 with a gate insulator film 29 interposed between the extending portion and the first gate electrode 30. A third guard ring region 42c is formed on one side of a second n-type region 24 such that the third guard ring region 42c is spaced apart from the second n-type region 24. A fourth guard ring region 42d is formed on the other side of the second n-type region 24 such that the fourth guard ring region 42d is spaced apart from the second n-type region 24. An eighth n-type region 44 and a fourth n-type region 27 are formed such that the eighth n-type region 44 is spaced apart from the third guard ring region 42c and the fourth n-type region 27. The second n-type region 24 and the eighth n-type region 44 are connected to each other via wiring 45. A second gate electrode 32 is formed above the portion of the p-type well region 22 extending between the fourth n-type region 27 and the eighth n-type region 44 with a gate insulator film 29 interposed between the extending portion and the second gate electrode 32. The third and fourth n-type regions 25 and 27 are connected to the integrator circuit 17. The first through fourth n-type guard ring regions 42a through 42d are connected to a biasing voltage circuit 13 for biasing.

By forming the first through fourth n-type guard ring regions 42a through 42d more deeply than the first, second, third, fourth, seventh, and eighth n-type regions 23, 24, 25, 27, 43, and 44, the photoelectron current 40 generated in the unselected optical sensor 2 is made to flow into the n-type guard ring regions 42c and 42d. Since the photoelectron current 40 generated in the unselected optical sensor 2 is prevented from flowing into the integrator circuit 17, noise reduction is facilitated.

The bias voltage for biasing the n-type guard ring regions 42a through 42d is most effective when the bias voltage is equal to the power supply voltage VDD. However, when the bias voltage is equal to the power supply voltage VDD, the voltage difference is formed between the bias voltage and the input terminal voltage of integrator circuit 17. The voltage difference makes a small leakage current flow from biasing voltage circuit 13 to integrator circuit 17 via the n-type guard ring regions 42a through 42d, causing noises. Therefore, it is desirable for the input terminal voltage of the integrator circuit 17 and the bias voltage for biasing n-type guard ring regions 42a through 42d to be equal to each other.

Figure 4:
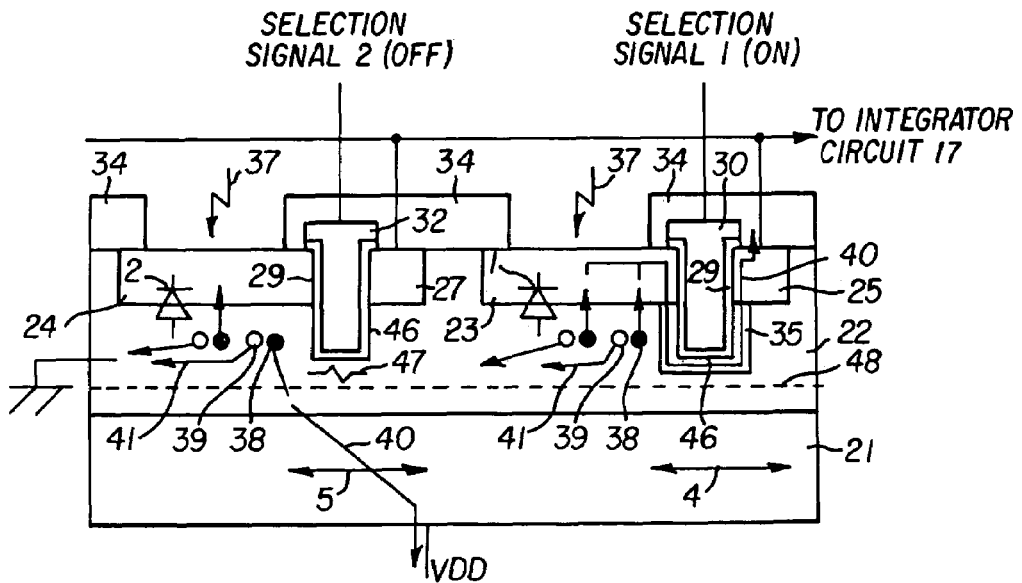
FIG. 4 is a cross sectional view showing the main portion of a range finder according to a fourth embodiment of the invention.

FIG. 4 is a cross sectional view showing the main portion of a range finder according to a fourth embodiment of the invention. The range finder according to the fourth embodiment is different from the range finder shown in FIG. 2 in that the first and second gate electrodes 30 and 32 have a trench gate structure. The range finder according to the fourth embodiment is different from the range finder shown in FIG. 2 also in that the biasing voltage circuit 13, the fifth n-type region 26, and the sixth n-type region 28 are excluded from the range finder according to the fourth embodiment. The photoelectron current 40 generated in the unselected optical sensor 2 is prevented from flowing into the fourth n-type region 27 by increasing the resistance 47 in the lateral direction of the p-type well region 22 below the trenches. In other words, the photoelectron current 40 flowing through the p-type well region 22 below the trenches is prevented from flowing into the fourth n-type region 27 by making it easier for photoelectron current 40 to enter the depletion layer 48 expanding from the n-type substrate 21 to the p-type well region 22. As a result, the noises generated in the unselected optical sensor 2 are reduced.

Figure 5:
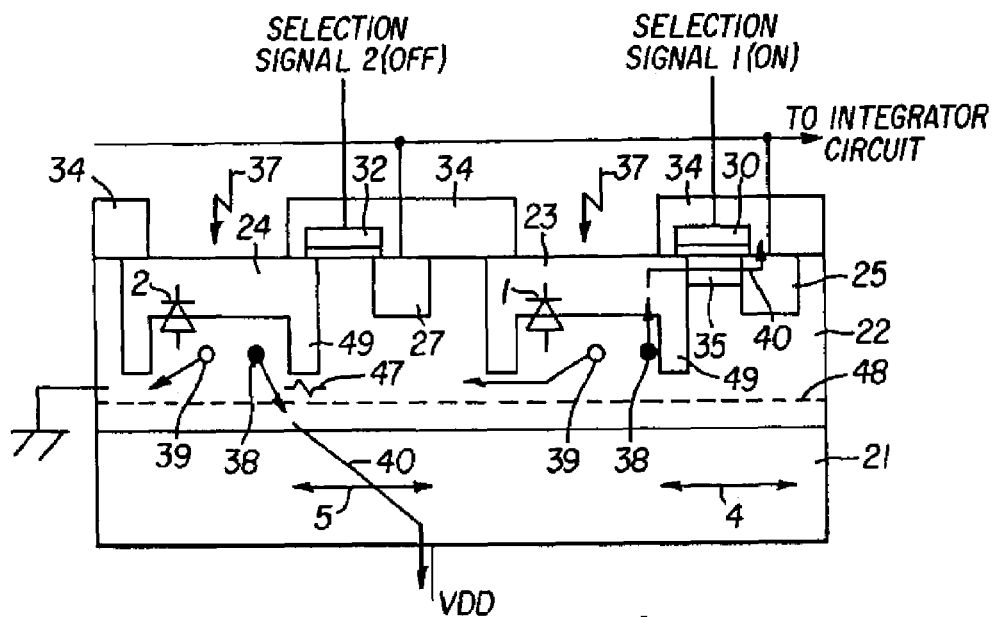
FIG. 5 is a cross sectional view showing the main portion of a range finder according to a fifth embodiment of the invention.
Figure 6:
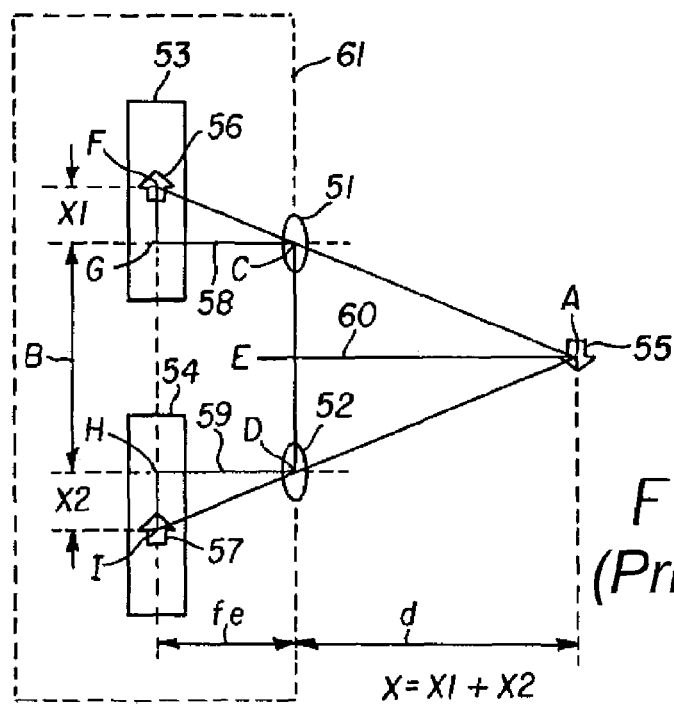
FIG. 6 is a diagram describing the triangulation principle.
Figure 7:
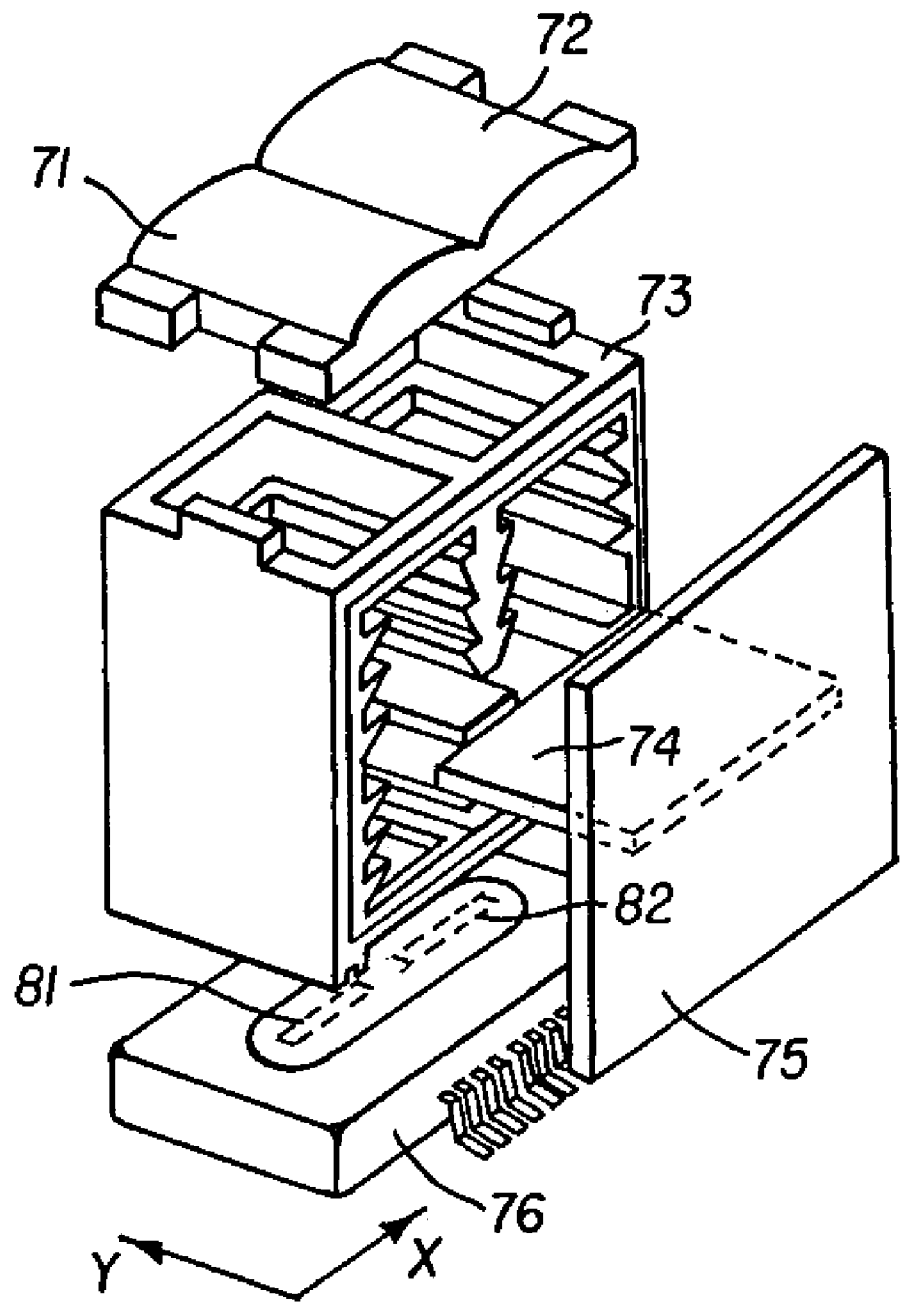
FIG. 7 is an exploded perspective view showing the structure of a range finder employing the triangular principle.
Figure 8A:
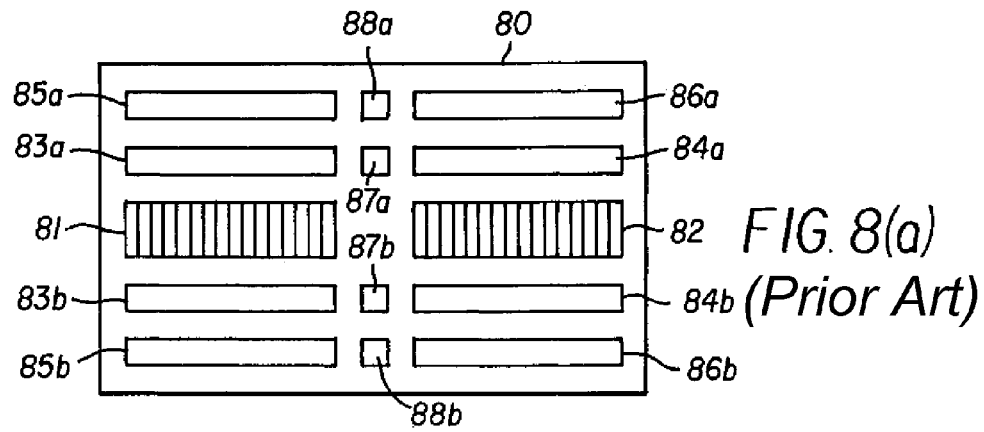
FIG. 8(a) is a top plan view of a semiconductor chip sealed in the AFIC.
Figure 8B:
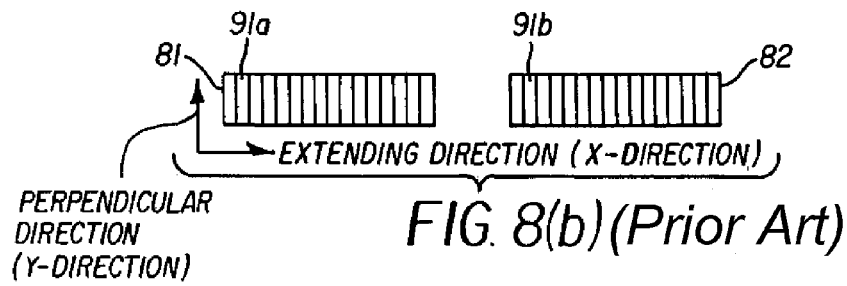
FIG. 8(b) is a top plan view of optical sensor arrays.
Figure 8C:
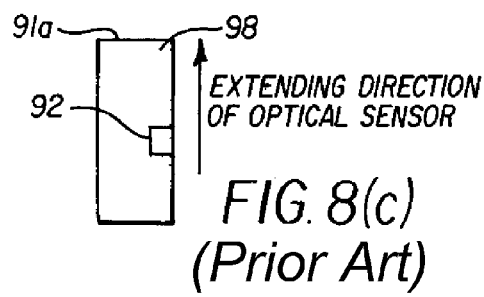
FIG. 8(c) is a top plan view of an optical sensor.
Figure 9:
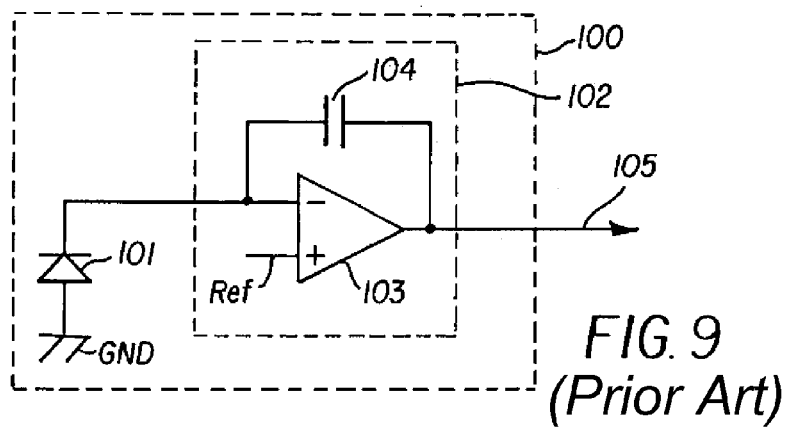
FIG. 9 is a block circuit diagram of an optical sensor circuit that constitutes a conventional range finder.
Figure 10:
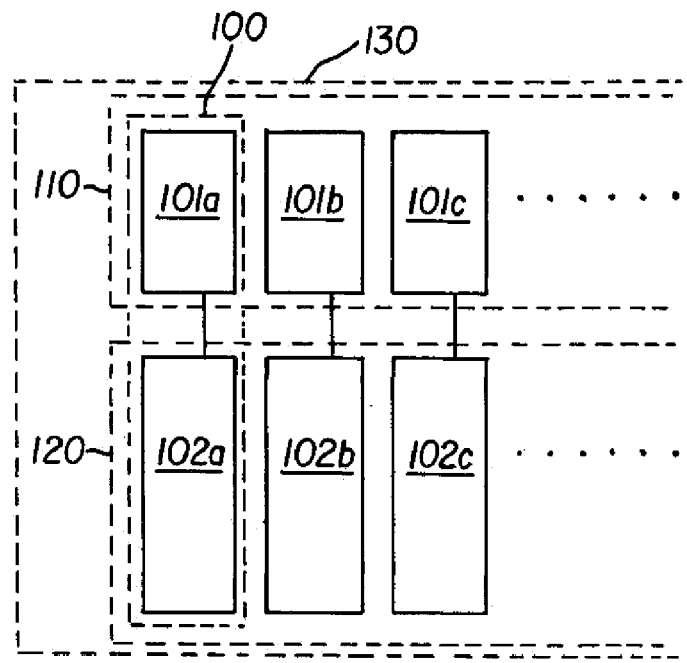
FIG. 10 is a block diagram showing the layout of a conventional optical sensor array.
Figure 11:
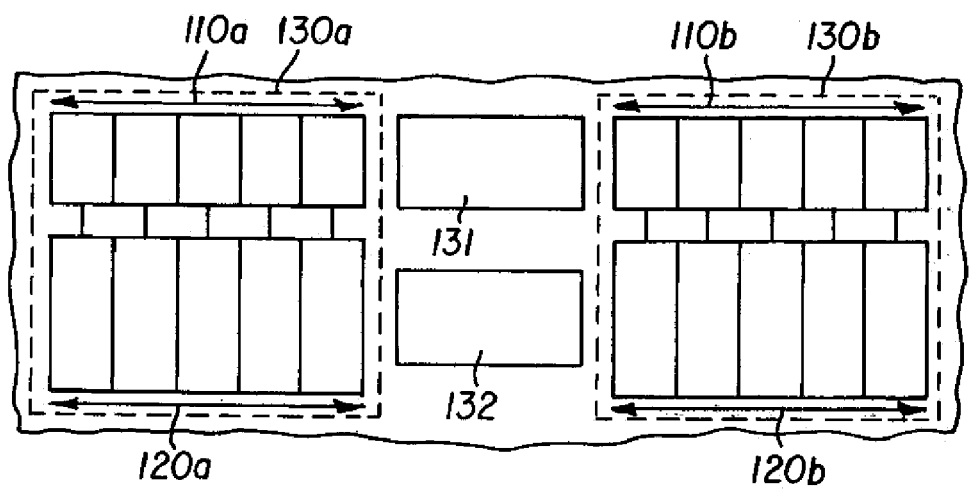
FIG. 11 is a diagram showing the main portion of the conventional range finder.
Figure 12:
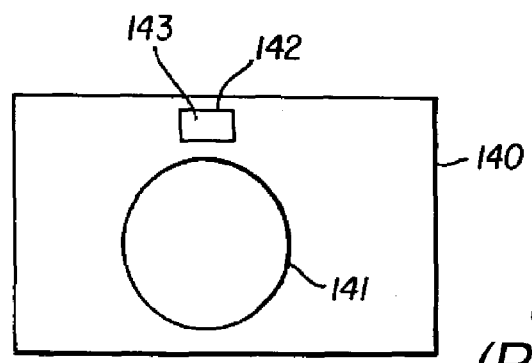
FIG. 12 is a diagram showing a conventional camera mounting thereon the range finder shown in FIG. 11.
Figure 13:
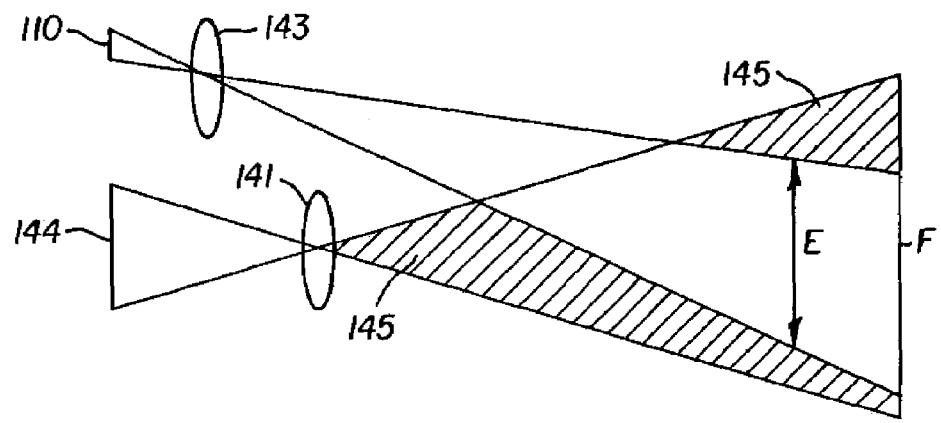
FIG. 13 is a diagram describing the parallax caused in the conventional camera.
Figure 14:
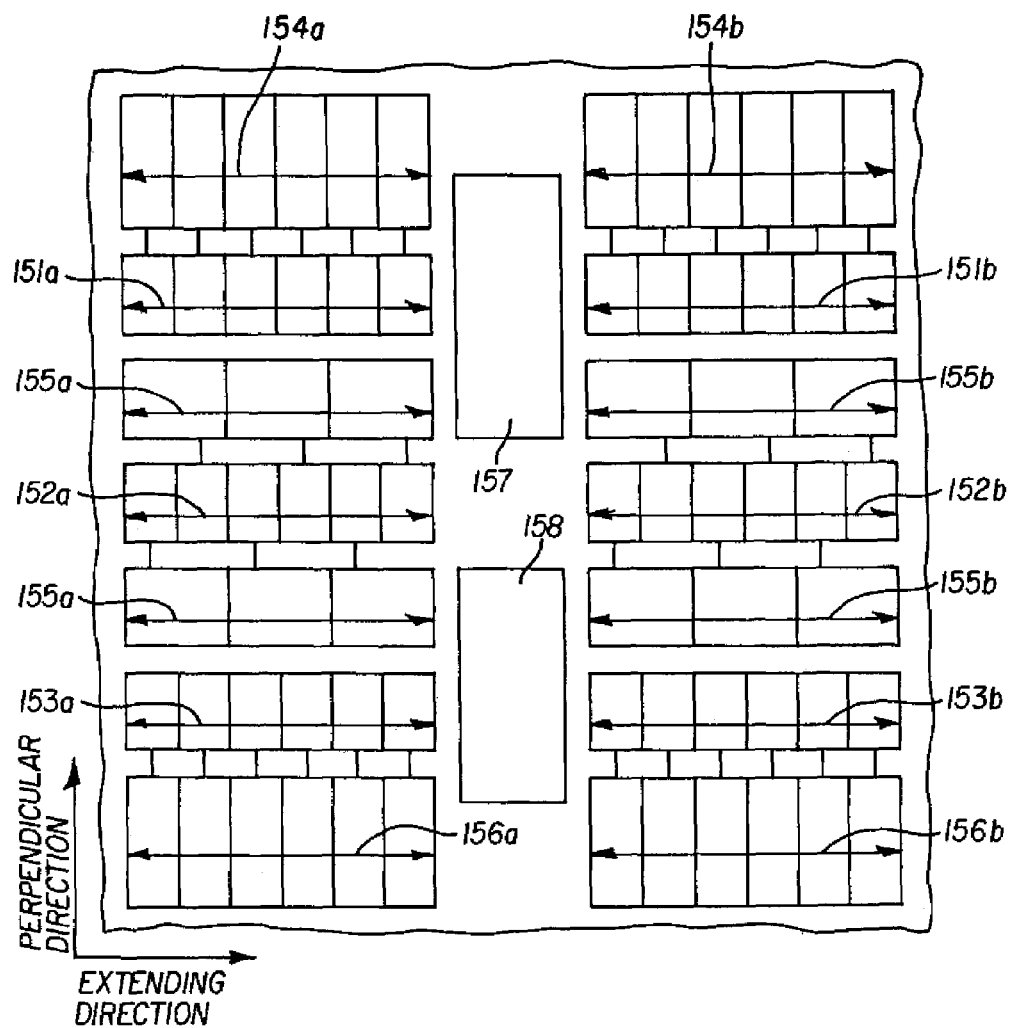
FIG. 14 is a diagram showing the main portion of a range finder employing a multi-line sensor.
Figure 15:
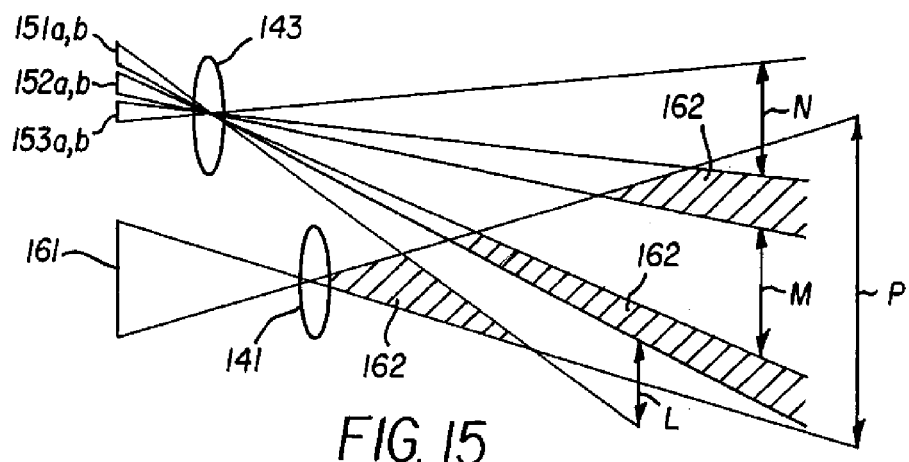
FIG. 15 is a diagram describing the parallax caused in the camera employing the multi-line sensor.
Figure 16:
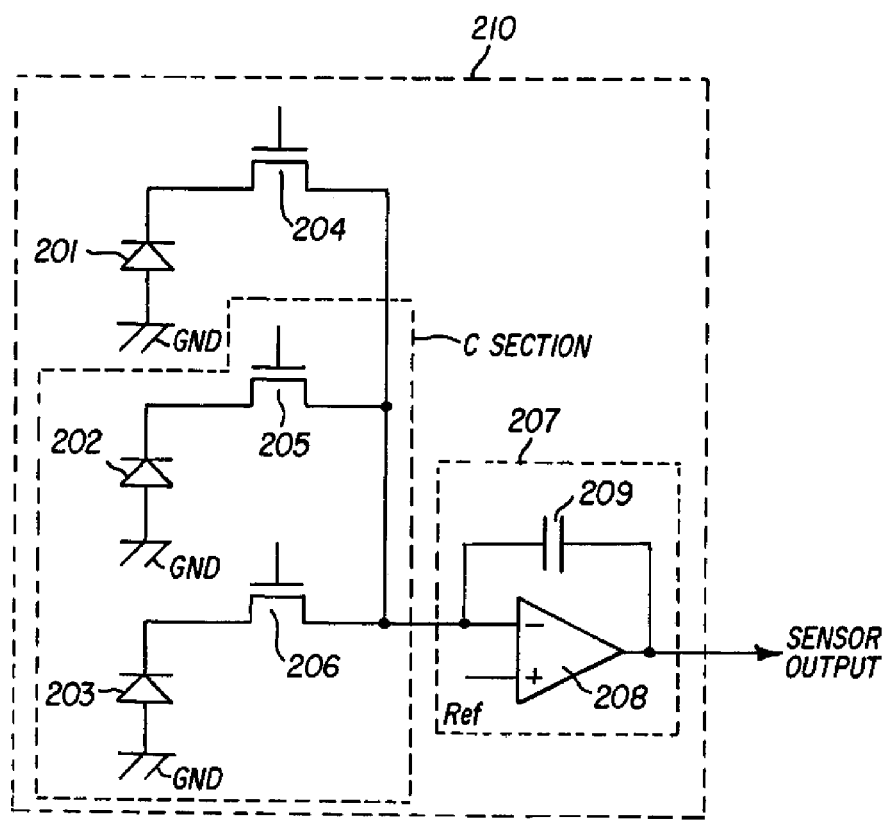
FIG. 16 is a block circuit diagram of an optical sensor circuit described in JP PA 2002-360788.

FIG. 5 is a cross sectional view showing the main portion of a range finder according to a fifth embodiment of the invention. The range finder according to the fifth embodiment is different from the range finder shown in FIG. 2 in that the end portions of the first and second n-type regions 23 and 24 below the shield films 34 are diffused more deeply than the portions of the first and second n-type regions 23 and 24, onto which light 37 impinges. Hereinafter the end portions of the first and second n-type regions 23 and 24 will be referred to as the "deep portions 49." The range finder according to the fifth embodiment is different from the range finder shown in FIG. 2 also in that the biasing voltage circuit 13, the fifth n-type region 26, and the sixth n-type region 28 are excluded from the range finder according to the fifth embodiment. The photoelectron current 40 generated in the unselected optical sensor 2 is prevented from flowing into the fourth n-type region 27 by increasing the resistance 47 in the lateral direction of the p-type well region 22 below the deep portions 49. In other words, the photoelectron current 40 flowing through the p-type well region 22 below the deep portions 49 is prevented from flowing into the fourth n-type region 27 by making it easier for the photoelectron current 40 to enter the depletion layer 48 expanding from the n-type substrate 21 to the p-type well region 22. As a result, the noises generated in the unselected optical sensor 2 are reduced.

Advantageously, the range finder includes a control means that controls the selection of at least one of the pairs of optical sensor arrays depending on the measuring range to set the effective light receiving area. The selected optical sensor arrays are connected to the integrator circuits by switching on the first selecting means (e.g., selection switches) and the unselected optical sensor arrays are connected to the biasing circuit by switching on the second selecting means (e.g., non-selection switches) simultaneously with switching on the selection switches. The photocharges formed in the unselected optical sensor arrays are made to flow to the biasing circuit but not to the integrator circuits. Therefore, the noises caused by the unselected optical sensor arrays are reduced.

By forming guard ring regions in the vicinities of both end portions of the optical sensor and by connecting the guard ring regions to the biasing circuit, the photo-charges from the unselected optical sensor arrays are made to flow to the biasing circuit but not to the integrator circuits. Therefore, the noises caused by the photo-charges in the unselected optical sensor arrays are reduced.

By providing the selection switches (MOSFETs) with a trench gate structure, the photo-charges from the unselected optical sensor arrays are extracted to the substrate. Therefore, the noises caused by the photo-charges in the unselected optical sensor arrays are reduced.

By extending the pn-junction in the optical sensor deeply in both end portions of the optical sensor, the photo-charges from the unselected optical sensor arrays are extracted to the substrate. Therefore, the noises caused by the photo-charges in the unselected optical sensor arrays are reduced. By setting the reference voltage of the integrator circuits and the bias voltage of the biasing circuit to be equal to each other, formation of leakage currents can be prevented in the selection switches. Therefore, the noises can be reduced.

The present range finder can be used, for example, in the automatic focusing mechanisms for cameras. The present range finder can correct the parallax between the image pickup optical system, which picks up the image of an object through image pickup lenses, and the range finding optical system, which measures the distance of the object through range finding lenses. Moreover, the range finder can measure the distances of images in a wide field of view. Moreover, the range finder can select optical sensor arrays one by one, integrate the currents of the optical sensor arrays, and synthesize image data to facilitate two-dimensional image recognition.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

This application is based on, and claims priority to, Japanese Application No. 2004-078537, filed on Mar. 18, 2004, and the disclosure of the priority applications, in its entirety, including the drawings, claims, and the specification thereof, is incorporated herein by reference.

What is claimed is:

1. A range finder comprising:
multiple pairs of optical sensor arrays, each array having multiple optical sensors arranged side by side, and the multiple pairs of optical sensor arrays being arranged parallel to each other;
a pair of range finding lenses for focusing images of an object onto at least one of the pairs of optical sensor arrays to measure the distance of the object based on image output signals indicating the light intensities received by the optical sensors of the at least one pair of optical sensor arrays; and
integrator circuits;
a biasing circuit;
control means for connecting the at least one pair of optical sensor arrays to the integrator circuits and for connecting all other pairs of optical sensor arrays other than the at least one pair of optical sensor arrays to the biasing circuit.

2. The range finder according to claim 1, wherein the biasing circuit is for applying a bias voltage to the optical sensor arrays connected to the biasing circuit.

3. The range finder according to any of claim 2, wherein the bias voltage is set to be equal to an input terminal voltage of the integrator circuits.

4. The range finder according to claim 2, wherein the control means comprises first selecting means for selecting the at least one of the pairs of optical sensor arrays to set an effective light receiving area, and second selecting means for selecting the other of the pairs of the optical sensor arrays other than the at least one of the pairs of optical sensor arrays selected by the first selecting means, and wherein the integrator circuits integrate the output currents from the optical sensors of the at least one of the pairs of optical sensor arrays selected by the first selecting means, and wherein the biasing circuit applies the bias voltage to the optical sensors of the pairs of optical sensor arrays selected by the second selecting means.

5. The range finder according to claim 4, further including:
a semiconductor substrate of a first conductivity type;
a semiconductor region of a second conductivity type on the semiconductor substrate;
first regions of the first conductivity type in the surface portion of the semiconductor region;
a second region of the first conductivity type formed on one side of each of the first regions and spaced apart from the first regions;
a third region of the first conductivity type formed on the other side of each of the first regions and spaced apart from the first regions;
a first gate electrode above a portion of the semiconductor region extending between each of the first regions and the respective second region with a gate insulator film interposed therebetween;
a second gate electrode above a portion of the semiconductor region extending between each of the first regions and the respective third region with a gate insulator film interposed therebetween,
wherein the optical sensor arrays comprises the semiconductor region and the first regions,
wherein the first selecting means comprises first MOSFETs, each comprising one of the first regions, the respective second region, and the respective first gate electrode,
wherein the second selecting means comprises second MOSFETs, each comprising one of the first regions, the respective third region, and the respective second gate electrode,
wherein the second region is connected to one of the integrator circuits,
wherein the third region is connected to the biasing circuit,
wherein the semiconductor region is grounded, and
wherein ON-OFF signals input to the first gate electrode and the respective second gate electrode are always opposite to each other.

6. The range finder according to claim 1, wherein the biasing circuit removes photo-charges from the pairs of optical sensor arrays connected to the biasing circuit.

7. The range finder according to claim 6, wherein the control means comprises selecting means for selecting the at least one of the pairs of optical sensor arrays to set an effective light receiving area, and wherein the integrator circuits integrate output currents from the optical sensors of the at least one of the pairs of optical sensor arrays selected by the selecting means.

8. The range finder according to claim 7, wherein the selection of the at least one of the pairs of optical sensor arrays selected by the selecting means is controlled depending on the measuring range of the object to set the effective light receiving area.

9. The range finder according to claim 7, further including:
a semiconductor substrate of a first conductivity type;
a semiconductor region of a second conductivity type on the semiconductor substrate;
first regions of the first conductivity type in the surface portion of the semiconductor region;

a first guard ring region of the first conductivity type formed on one side of each of the first regions and spaced apart from the first regions;

a second guard ring region of the first conductivity type formed on the other side of each of the first regions and spaced apart from the first regions;

an optical sensor connecting region of the first conductivity type spaced apart from the respective first guard ring region and connected electrically to each of the first regions;

an integrator circuit input region of the first conductivity type spaced apart from the respective optical sensor connecting region;

a gate electrode above a portion of the semiconductor region extending between the respective optical sensor connecting region and the respective integrator circuit input region with a gate insulator film interposed therebetween, wherein the optical sensor arrays comprising the semiconductor region and the first regions, wherein the selecting means comprises MOSFETS, each comprising the optical sensor connecting region, the respective integrator circuit input region, and the respective gate electrode, wherein the integrator circuit input region is connected to one of the integrator circuits, wherein the first and second guard ring regions are connected to the biasing circuit, and wherein the semiconductor region is grounded.

10. The range finder according to claim 1, wherein the integrator circuits form a pair of integrator circuit arrays.

11. A range finder comprising:

multiple pairs of optical sensor arrays, each array having multiple optical sensors arranged side by side, and the multiple pairs of optical sensor arrays being arranged parallel to each other;

a pair of range finding lenses for focusing images of an object onto at least one of the pairs of optical sensor arrays to measure the distance of the object based on image output signals indicating the light intensities received by the optical sensors of the at least one pair of optical sensor arrays; and selecting means for selecting the at least one pair of optical sensor arrays to set an effective light receiving area;

integrator circuits for integrating output currents from the optical sensors of the at least one pair of optical sensor arrays selected by the selecting means; and means for removing photocharges from the optical sensors of the pairs of arrays not selected by the selecting means to prevent the photocharges from flowing to the integrator circuits.

12. The range finder according to claim 11, further including:

a semiconductor substrate of a first conductivity type;
a semiconductor region of a second conductivity type on the semiconductor substrate;

first regions of the first conductivity type in the surface portion of the semiconductor region;

a second region of the first conductivity type formed on one side of each of the first regions and spaced apart from the first regions; and a gate electrode extending between each of the first regions and the respective second region with a gate insulator film interposed therebetween, wherein the optical sensor arrays comprises the semiconductor region and the first regions, wherein the selecting means comprises MOSFETs, each comprising one of the first regions, the respective second region and the respective gate electrode, wherein the second region is connected to one of the integrator circuits, wherein the semiconductor region is grounded, and wherein the pn-junction between the semiconductor substrate and the semiconductor region is biased in reverse.

13. The range finder according to claim 12, further including trenches in the semiconductor region, one of the trenches being in contact with each of the first regions and the respective second region, and wherein the gate electrodes are formed in the trenches.

14. The range finder according to claim 12, wherein both end portions of the first regions are diffused deeply.

15. The range finder according to claim 11, further including control means for controlling the selection of the at least one of the pairs of optical sensor arrays selected by the selecting means depending on the measuring range of the object to set the effective light receiving area.

16. A method of reducing signal noise in a range finder comprising multiple pairs of optical sensor arrays, each array having multiple optical sensors arranged side by side, and the multiple pairs of optical sensor arrays being arranged parallel to each other; a pair of range finding lenses for focusing images of an object onto at least one of the pairs of optical sensor arrays to measure the distance of the object based on image output signals indicating the light intensities received by the optical sensors of the at least one pair of optical sensor arrays; and integrator circuits, and control means for connecting the at least one pair of optical sensor arrays to the integrator circuits, the method comprising the steps of:

providing a biasing circuit for applying a bias voltage or for removing photocharges from the pairs of optical sensor arrays;

connecting all pairs of optical sensor arrays other than the at least one pair of optical sensor arrays to the biasing circuit to allow photocharges therefrom to flow to the biasing circuit, thereby preventing the photocharges therefrom flowing into the integrator circuits.

* * * * *